(12) United States Patent
Weber

(10) Patent No.: US 8,984,092 B2
(45) Date of Patent: Mar. 17, 2015

(54) METHOD FOR TRANSMITTING TELEGRAMS IN AN AUTOMATION SYSTEM

(75) Inventor: Karl Weber, Altdorf (DE)

(73) Assignee: Siemens Aktiengesellschaft, München (DE)

( * ) Notice: Subject to any disclaimer, the term of this patent is extended or adjusted under 35 U.S.C. 154(b) by 247 days.

(21) Appl. No.: 13/598,031

(22) Filed: Aug. 29, 2012

(65) Prior Publication Data

US 2013/0232222 A1 Sep. 5, 2013

(30) Foreign Application Priority Data

Aug. 30, 2011 (EP) .................................... 11179360

(51) Int. Cl.
- *G06F 15/16* (2006.01)
- *H04L 29/08* (2006.01)
- *H04L 12/417* (2006.01)

(52) U.S. Cl.
CPC ............. *H04L 29/08* (2013.01); *H04L 12/417* (2013.01); *H04L 67/12* (2013.01)
USPC ...................................................... 709/217

(58) Field of Classification Search
None
See application file for complete search history.

(56) References Cited

U.S. PATENT DOCUMENTS

| | | | |
|---|---|---|---|
| 6,934,418 B2 * | 8/2005 | Okada ........................... | 382/240 |
| 7,779,336 B2 * | 8/2010 | Wenger et al. ................ | 714/776 |
| 8,601,051 B2 * | 12/2013 | Wang ............................. | 709/203 |
| 8,670,346 B2 * | 3/2014 | Torres Ramon et al. ...... | 370/253 |
| 2003/0044077 A1 * | 3/2003 | Okada ........................... | 382/239 |
| 2010/0008372 A1 | 1/2010 | Weber | |
| 2010/0070666 A1 | 3/2010 | Brindle | |

FOREIGN PATENT DOCUMENTS

| | | |
|---|---|---|
| WO | WO 2008/092805 A2 | 8/2008 |
| WO | WO 2009/098616 A1 | 8/2009 |

* cited by examiner

*Primary Examiner* — Brian P Whipple
(74) *Attorney, Agent, or Firm* — Henry M. Feiereisen LLC

(57) ABSTRACT

A method for transmitting telegrams in an automation system which is composed of a plurality of network components connected to form a network, includes the steps of a) receiving with a first of the network components a first telegram composed of datagrams associated with each of the network components, b) removing from the first telegram a first datagram associated with the first network component, c) inserting into the first telegram an updated datagram associated with the first network component, thereby forming a second telegram, and d) transmitting the second telegram to at least one of the other network components. The steps a) through d) are carried out by each of the network components.

8 Claims, 4 Drawing Sheets

METHOD FOR TRANSMITTING TELEGRAMS IN AN AUTOMATION SYSTEM

CROSS-REFERENCES TO RELATED APPLICATIONS

This application claims the priority of European Patent Application, Serial No. 11179360.0, filed Aug. 30, 2011, pursuant to 35 U.S.C. 119(a)-(d), the content of which is incorporated herein by reference in its entirety as if fully set forth herein.

BACKGROUND OF THE INVENTION

The present invention relates to a method for transmitting telegrams in an automation system. The present invention also relates to an automation system.

The following discussion of related art is provided to assist the reader in understanding the advantages of the invention, and is not to be construed as an admission that this related art is prior art to this invention.

Real-time systems are preferably used as the communications link in automation systems since these guarantee excellent performance in relation to communication and high availability. In some cases the data is relevant not only to the individual network components of the automation system, but to a range of applications. Communication between the individual network components of an automation system which brings the required data to its destination with the least possible delay would here be ideal. A natural limit is given here by the data rate of the communications link. The delay in data transmission should not be critically limited by additional influencing variables, however. This should also apply if individual network components, which are located on the path between source and destination, fail.

In automation systems data are transmitted between the individual network components in the form of telegrams by way of example. Field buses, which are defined in the standard IEC 61158, are conventionally used as data lines. Ethernet connections by way of example are used for this purpose and these comprise appropriate switches, in which the data are channeled directly from the source to the destination with the aid of the address formations at the start of the telegram. A minimum delay of the switches must here be included. To be able to guarantee corresponding decoupling in the event of a failure what is known as the "store-and-forward principle" is usually used which buffers the individual telegrams in each network component. This results in a total transmission time which is conventionally in the range of a few milliseconds. An Ethernet connection is basically an active network in which the required availability in the event of a failure of one of the network components or a network segment is achieved by a redundant path selection. This is structurally achieved by way of example in that a linear topology is combined to form a ring.

In a series of applications one data source responds to a plurality of data sinks (Multicast). This is the case for example if the measured value for a current is required for various protective functions. Such a multicast communications link assumes that for reasons of efficiency the data is only transmitted once. A further important aspect is the synchronization of the data. If the data are temporally distorted then the result of a link is doubtful. It is likewise necessary that non-time-critical data can also be transmitted on the same communications channel.

Other real-time systems such as EtherCAT use a packetized transmission. However, a multicast connection may only be achieved starting from a master. The sequence plays here also a decisive role due to the direction dependency.

Many real-time systems such as Profinet reserve a certain data rate for cyclical services. The remaining data can then be exchanged via a standard Ethernet connection. The efficiency of the data transmission does not change in principle therefore, but the minimum cycle times are limited in exchange. A further problematical aspect is what is known as the Frame Overhead.

In a client-server communication relationship this is solved by a dynamic packetizing behavior in that a selected component is either the source or the sink of the data. With multicast connections an individual transmission can also conventionally be used, with both the data transmission rate and the system load being hereby limited.

It would therefore be desirable and advantageous to obviate prior art shortcomings and to provide an improved automation system with a plurality of network components, which allows a more effective data transmission between the individual network components.

SUMMARY OF THE INVENTION

According to one aspect of the present invention, a method for transmitting telegrams in an automation system which is composed of a plurality of network components connected to form a network, includes the steps of a) receiving with a first of the network components a first telegram composed of datagrams associated with each of the network components, b) removing from the first telegram a first datagram associated with the first network component, c) inserting into the first telegram an updated datagram associated with the first network component, thereby forming a second telegram, and d) transmitting the second telegram to at least one of the other network components. The steps a) through d) are carried out by each of the network components.

According to another aspect of the present invention, an automation system includes a plurality of network components connected to form a network. Each of the plurality of network components is configured to a) receive a first telegram comprising datagrams associated with each of the plurality of network components, b) remove from the first telegram a first datagram associated with the network component that received the first telegram, c) insert into the first telegram an updated datagram associated with the network component that received the first telegram, thereby forming a second telegram, and d) transmit the second telegram to at least one of the other network components. The steps a) through d) are carried out by each of the plurality of network components.

A hierarchical structure between the individual network components is not required. The individual network components are arranged in a multicast connection. Each network component generates a corresponding frame with its own datagram. Parallel therewith a first telegram, which includes a corresponding datagram for each of the network components, is received from each of the network components. Each of the network components can remove the datagram with which it is associated and insert an updated datagram associated with it. The second telegram thus formed is transmitted to the other network components of the network. The received data can be used as desired by each network component.

Such a datagram may include by way of example a data frame, data packets or data segments. An automation system may contain corresponding measured values or variables which characterize an operating state of the individual network component. Fast data transmission between the individual network components and increased availability may be achieved in this way.

According to an advantageous feature of the present invention, the first telegram received by the network component may include a datagram inserted by the network component at an earlier instant, which is then removed from the network component and the updated datagram is inserted. The individual network components are connected to each other in the network such that the datagram inserted by a network component at an earlier instant is received by this network component again. The network component may—if necessary—update its own datagram accordingly and insert it in the telegram. Therefore each of the network components only monitors its own datagram and updates it accordingly. Particularly effective data transmission between the individual network components of an automation system can be achieved in this way.

According to another advantageous feature of the present invention, the datagrams received by the network component in the first telegram may be forwarded to the other network components of the network by the network component in the second telegram. In the first telegram each of the network components receives the corresponding datagrams of the other network components of the network. The corresponding datagrams can be easily exchanged among the individual network components and made available in this way. The datagrams of the other network components, received by the respective network component, are buffered accordingly by way of example in a memory element of the network component and transmitted in the second telegram. These datagrams are not changed here. The datagrams of the other network components can be transmitted together with insertion of the updated datagram of the separate network component. The datagrams can therefore be exchanged particularly easily and effectively between the individual network components.

According to another advantageous feature of the present invention, a minimum duration may be specified for each of the network components between receipt of the first telegram and transmission of the second telegram. In the case of time-controlled transmission of the datagrams between the individual network components, the first telegram may arrive only after the second telegram has already been transmitted. A corresponding minimum duration can be specified to avoid this. Particularly secure and reliable transmission of the datagrams between the individual network components can be achieved in this way. A maximum delay between receipt of the first telegram and transmission of the second telegram can likewise be taken into account. The period specified for the maximum delay can either be statically determined in the configuration of the automation system or dynamically by a measurement of a corresponding delay time.

According to another advantageous feature of the present invention, the telegrams may be transmitted synchronously by all network components. The transmission of the telegrams by all network components is hereby started at a predefined instant and a corresponding cycle is therefore enabled. Corresponding delay times can be minimized and the data can therefore be transmitted particularly securely and reliably due to synchronous transmission of the telegrams.

According to another advantageous feature of the present invention, transmission of the telegrams by one of the network components may be started based on an event. The method for transmitting telegrams in an automation system may also be carried out in an event-controlled manner, wherein one of the network components may initiate the process by initially sending its own datagram to the remaining network components. The individual datagrams of the respective network components can be incorporated in the telegram by way of example in a first pass and the individual datagrams can be distributed in a second pass. The automation system can therefore be controlled based on a certain event, whereafter the data transfer between the individual network components can be started. The automation system can thus be operated particularly effectively.

According to an advantageous feature of the present invention, the respective datagrams may include a previously determined amount of data in the first and second telegrams. Fixing the amount of data in advance avoids a situation where a first telegram is received by the network component after the second telegram has been sent. Particularly secure and reliable communication between the individual network components can therefore be achieved. The datagrams can likewise be divided by way of example into two or more frames. This can be utilized by way of example if the maximum frame size of the data link used is exceeded. A corresponding delay time can then also be taken into account to ensure that the individual frames are reliably transmitted to the network components.

According to another advantageous feature of the present invention, the network components in the network may be arranged in a ring structure. With this topology transmission of the second telegram by the respective network components can always be started at a defined instant. The datagrams may therefore be easily exchanged between the individual network components.

According to another advantageous feature of the present invention, the network components in the network may be arranged in a linear structure. The individual network components are likewise arranged in a linear topology. In this arrangement, the start of transmission of the telegrams may be initiated by way of example by the network components located at the ends of the linear structure. Corresponding hierarchical systems may likewise be implemented with the automation system.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
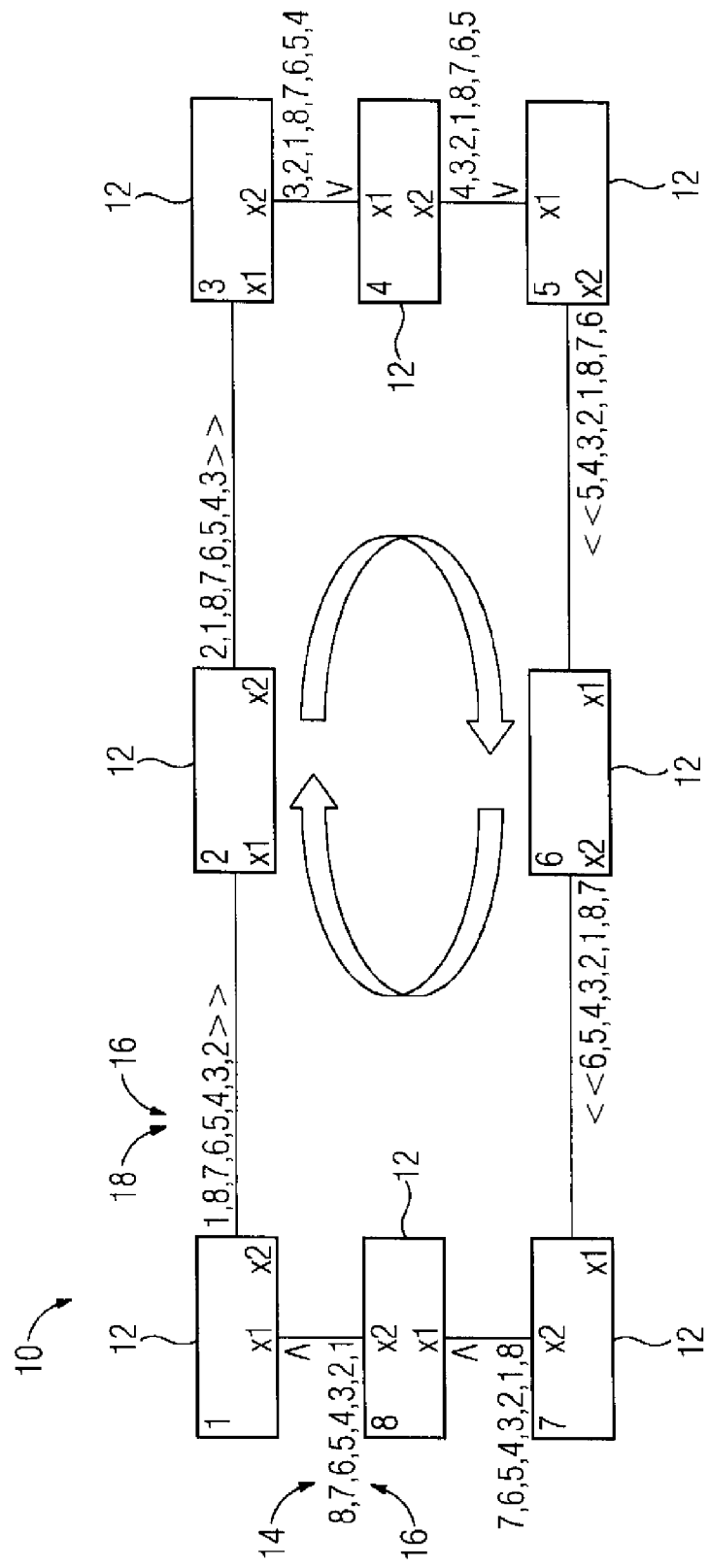
FIG. 1 shows a schematic diagram of an automation system is according to the present invention, which includes a plurality of network components arranged in a ring structure.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a schematic diagram of an automation system 10 in which a plurality of network components 12 are connected to form a network. In the present case the network components 12 are arranged in a ring structure. The ring structure illustrated in FIG. 1 comprises eight network components 12 which are numbered accordingly in the diagram. Each of the network components 12 has two ports which are designated X1 and X2.

Data is exchanged between the individual network components 12. In the present case this is described using the example of network component 12 which is designated by the number one. Network component 12, which is designated by the number one, receives a first telegram 14 via its port X1. This first telegram 14 comprises one datagram 16 respectively for each of the network components 12. In the diagram in FIG. 1 the datagrams 16 are shown by the respective digits of the network components 12 which are separated from each other by commas. Here each digit in the datagram 16 corresponds to the corresponding network component 12. A datagram 16 is hereinafter taken to mean a corresponding data frame, data packets or data segments. These datagrams 16 can contain by way of example corresponding measured values of the individual network components 12 and/or variables can be stored in the datagrams 16 which characterize the operating state of the respective network component 12.

Network component 12, designated by the number one, receives the first telegram 14. Network component 12, designated by the number one, removes the datagram 16 with which it is associated and which is represented by the digit one. A second telegram 18, in which an updated datagram 16, associated with the network component 12 is inserted, is transmitted by this network component 12, designated by the number one. This second telegram 18 is forwarded to network component 12 which is designated by the number two.

In the exemplary embodiment shown here the telegrams 14, 18 are exchanged between the individual network components 12 in the clockwise direction. The datagrams 16 associated with the network component 12 are updated by the respective network component 12 accordingly. The datagrams 16 of the remaining network components 12 are forwarded unchanged in the second telegram 18. Therefore only the datagram 16, which is associated with corresponding network component 12, is updated by each of the network components 12 when the first telegram 14 is received. The data contained in the datagram 16 can be deleted accordingly and re-inserted or overwritten for this purpose.

Figure 5:
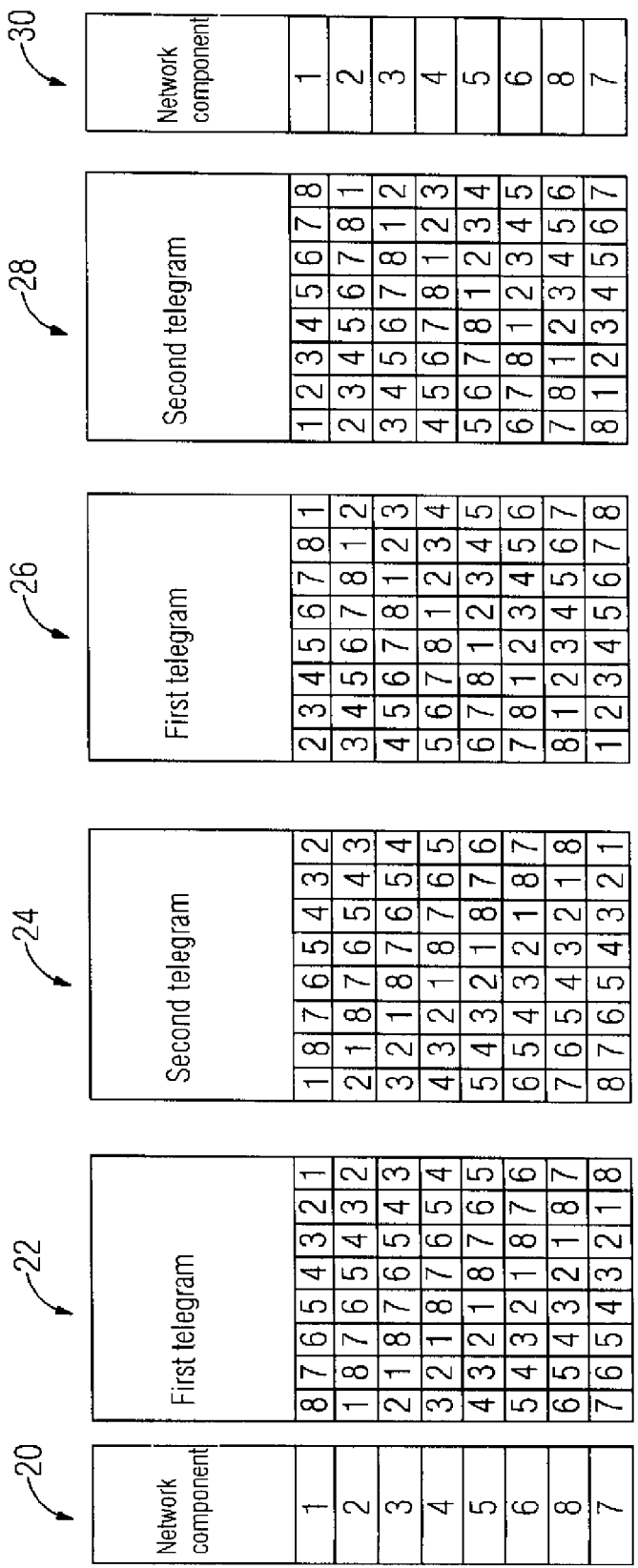
FIG. 5 shows in form of tables the arrangement of the datagrams in the telegrams of the network components.

FIG. 5 shows in form of tables 22, 24, 26 and 28 the corresponding telegrams 14, 18 of the respective network components 12. In a first table 20 the numbers of the individual network components 12 are shown one below the other. In a further table 22 the first telegrams 14 of the network components 12 are shown in the respective rows by the numbers one to eight. Table 24 shows the second telegrams 18 respectively of the respective network components 12. Tables 22 to 24 apply to the case where the telegrams 14, 18 are exchanged between the eight network components 12 in the clockwise direction. Tables 26 to 30 shown in FIG. 5 apply to the case where the telegrams 14, 18 are exchanged in the anticlockwise direction in the ring structure described above.

The rows of table 26 show the first telegrams 14 of the respective network components 12 and the rows of table 28 the respective second telegrams 18 of the network components 12, whose numbering is shown in table 30.

Figure 2:
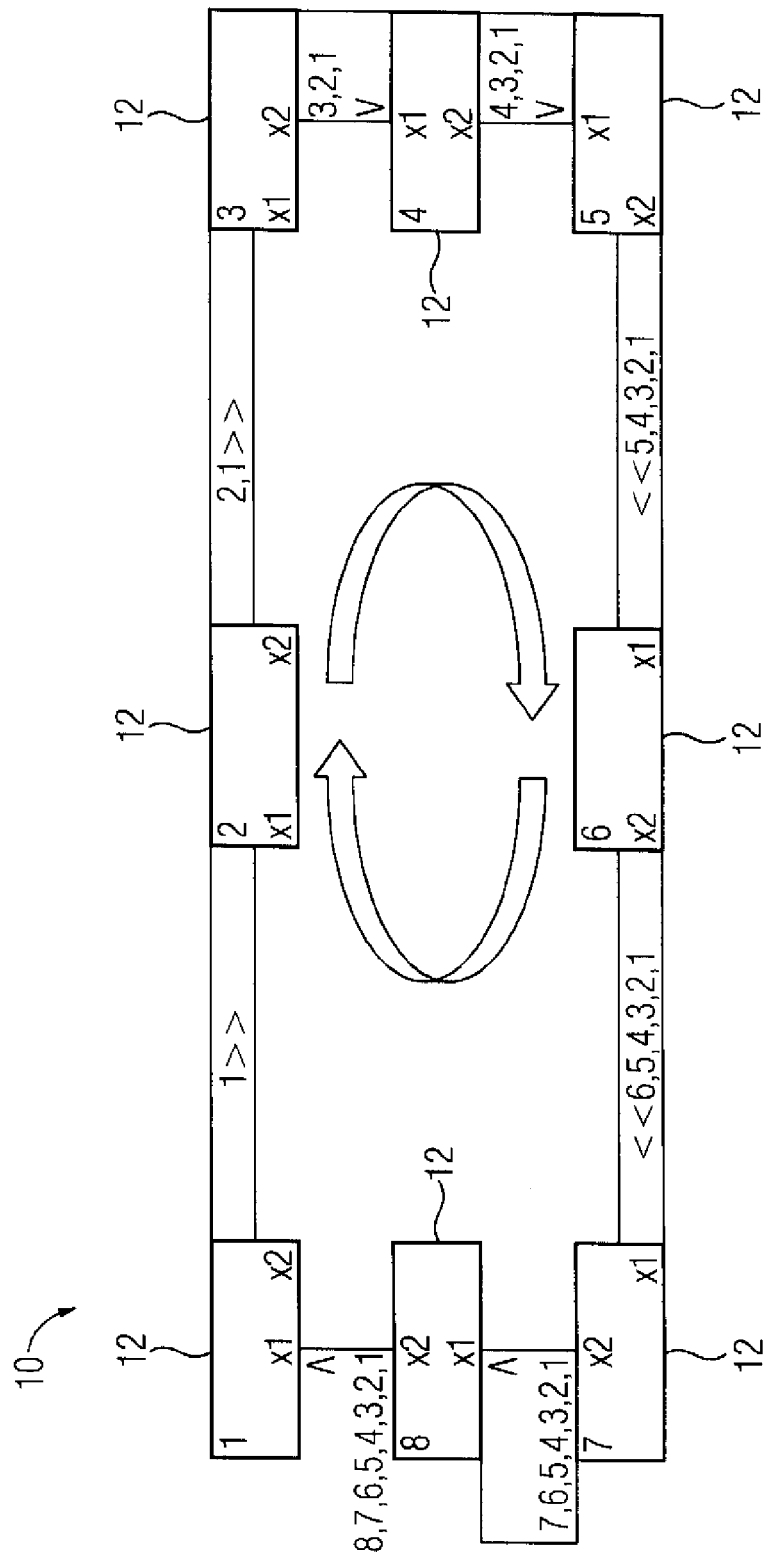
FIG. 2 shows a schematic diagram of another embodiment of the automation system according to FIG. 1.

In the example shown in FIG. 1 the second telegrams 18 are synchronously transmitted by the respective network components 12 at previously determined instants to the respective adjacent network component 12. It is also conceivable for the telegrams 14, 18 to be transmitted between the individual network components 12 in an event-controlled manner. FIG. 2 shows an example of this kind. Transmission of the telegrams 14, 18 is started here by network component 12, designated by the number one. The telegrams 14, 18 are each forwarded in the clockwise direction between the individual network components 12 and the datagrams 16 of the individual network components are written into the respective second telegram 18 in a first pass. If, following the first pass, the telegram 14, 18 has again arrived at the network component, designated by the number one, data can be exchanged as described above.

Figure 3:
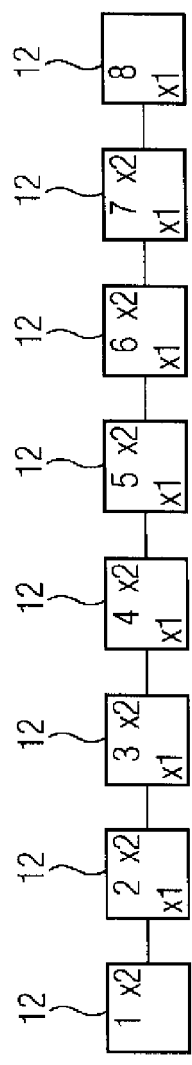
FIG. 3 shows a schematic diagram of an automation system according to the present invention, wherein the network components are arranged in a linear structure.

FIG. 3 shows a schematic diagram of an automation system 10 in which the individual network components 12 are arranged in a linear structure. The telegrams 14, 18 can here be transmitted in either a time-controlled manner or in an event-controlled manner. Transmission of the telegrams 14, 18 can be initiated by way of example by one of the network components 12 which is located at the start or end of the linear structure.

Figure 4:
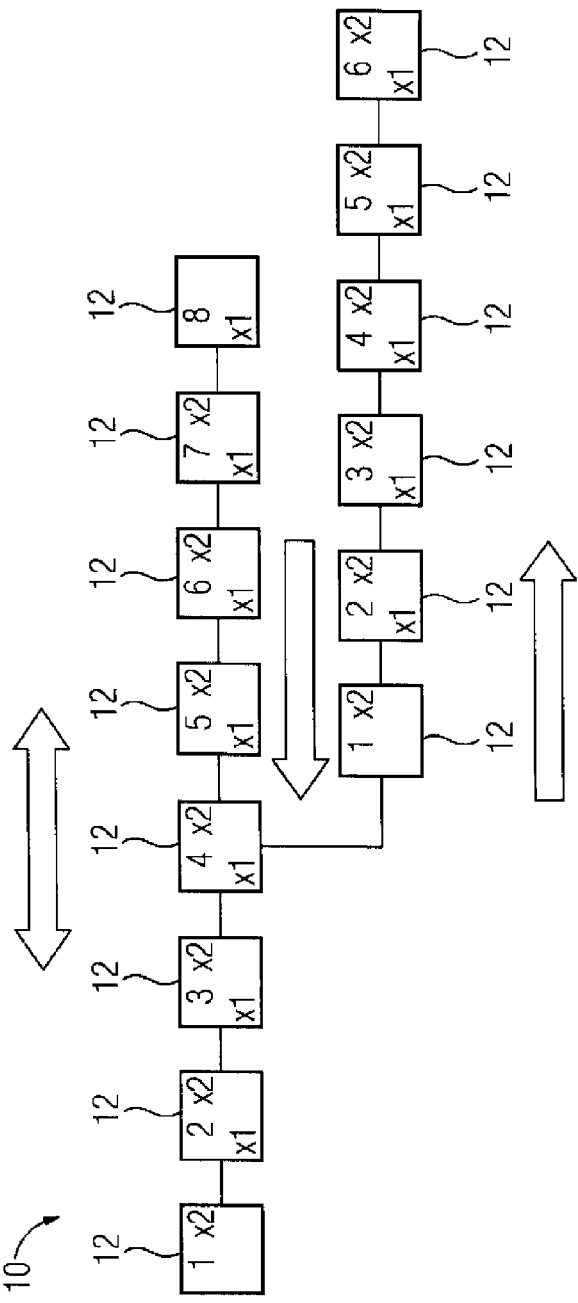
FIG. 4 shows a schematic diagram of an automation system according to the present invention, wherein the network components are arranged in a hierarchical structure.

FIG. 4 shows a schematic diagram of an automation system 10 in which the individual network components 12 are arranged in a hierarchical structure. Here network component 12 in the upper line, designated by the number four, is designed as a higher-order network component 12. The telegrams 14, 18 can be exchanged between the network components 12 as described above in this case as well.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A method for transmitting telegrams in an automation system comprising a plurality of network components connected to form a network, comprising the steps of:
   a) receiving with a first of the network components a first telegram comprising a plurality of original datagrams and containing information from all of the network components in the network, with each of the original datagrams being associated with each of the network components in one-to-one correspondence,
   b) removing from the first telegram a first datagram associated with the first network component,
   c) inserting into the first telegram an updated datagram associated with the first network component, thereby forming a second telegram containing the updated datagram and the original datagrams associated with the network components other than the first network component, and d) transmitting the second telegram to at least one of the other network components, wherein the steps a) through d) are carried out by each of the network components, wherein a minimum duration is specified for each of the network components between receipt of the first telegram and transmission of the second telegram, and wherein the telegrams are transmitted synchronously by all network components.

2. The method of claim 1, wherein the first datagram was inserted into the first telegram by the first network component at an earlier instant.

3. The method of claim 1, wherein the datagrams associated with the other network components received with the first telegram are transmitted unchanged in the second telegram.

4. The method of claim 1, wherein transmission of the telegrams is started by one of the network components based on an event.

5. An automation system, comprising:

a plurality of network components connected to form a network, wherein each of the plurality of network components is configured to:

a) receive a first telegram comprising a plurality of original datagrams and containing information from all of the network components in the network, with each of the original datagrams being associated with each of the network components in one-to-one correspondence, b) remove from the first telegram a first datagram associated with the network component that received the first telegram, c) insert into the first telegram an updated datagram associated with the network component that received the first telegram, thereby forming a second telegram containing the updated datagram and the original datagrams associated with the network components other than the first network component, and d) transmit the second telegram to at least one of the other network components, wherein the steps a) through d) are carried out by each of the plurality of network components, wherein a minimum duration is specified for each of the network components between receipt of the first telegram and transmission of the second telegram, and wherein the telegrams are transmitted synchronously by all network components.

6. The automation system of claim 5, wherein the respective datagrams in the first and second telegram comprise a previously determined amount of data.

7. The automation system of claim 5, wherein the network components are arranged in a ring structure in the network.

8. The automation system of claim 5, wherein the network components are arranged in a linear structure in the network.

\* \* \* \* \*